Feb. 7, 1950          C. BOGER          2,496,574

TIMING CONTROL SYSTEM

Filed April 9, 1948          2 Sheets-Sheet 1

INVENTOR.
Clyde Boger
BY
Barnes, Kisselle, Laughlin & Raisch
ATTORNEYS

Feb. 7, 1950 — C. BOGER — 2,496,574
TIMING CONTROL SYSTEM
Filed April 9, 1948 — 2 Sheets-Sheet 2

INVENTOR.
Clyde Boger
BY
Barnes, Kisselle, Laughlin - Raisch
ATTORNEYS

Patented Feb. 7, 1950

2,496,574

UNITED STATES PATENT OFFICE 2,496,574

TIMING CONTROL SYSTEM

Clyde Boger, Sault Ste. Marie, Mich.

Application April 9, 1948, Serial No. 20,031

7 Claims. (Cl. 318—443)

1

This invention relates to a timing control system and has particularly to do with a control for a running circuit which will cause automatic timed delays.

It is an object of the invention to provide an inexpensive running circuit for a punch press, pressure press or other similar mechanism with a provision for automatic operation of such circuit and accurate control.

It is a further object of the invention to provide a circuit control for an operating mechanism which will interrupt itself automatically for any predetermined time period and restart automatically at the end of such period.

It is a further object of the invention to provide a control circuit which is made of inexpensive elements and which is rugged in nature so that it is dependable and long-lasting with a total absence of sensitive or easily breakable parts.

Other objects and features of the invention relating to details of the circuit and to the operation will be apparent in the following description and claims.

Figure 1:
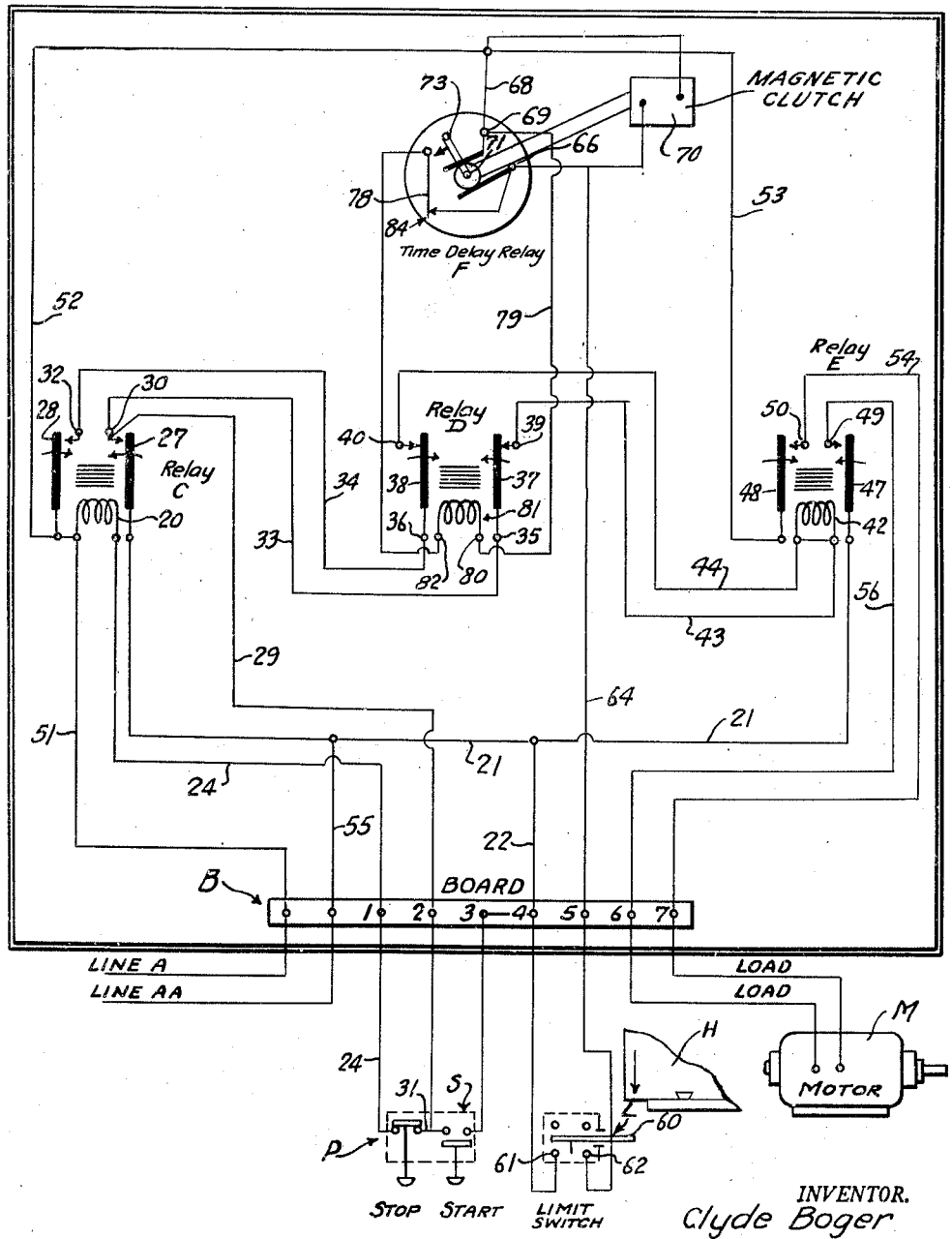
Figure 1 is a circuit diagram showing the electrical parts of the apparatus in conventional display.
Figure 2:
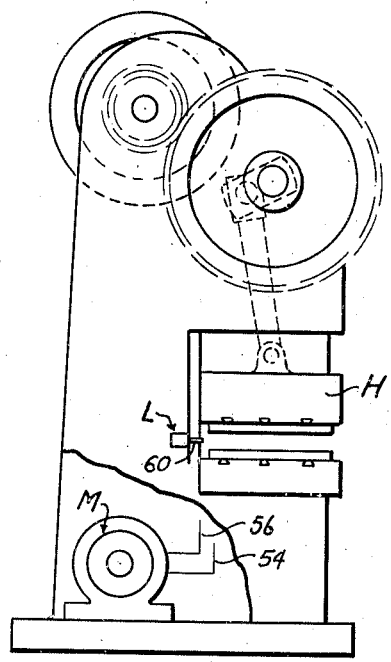
Figure 2 illustrates a common press which may be controlled by this circuit.

The apparatus making up the control circuit for a press such as shown in Figure 2 consists first of a motor M to be controlled and which is operatively connected to the press in a manner not shown. A terminal board B has a plurality of connection points to be described. Start switch S and stop switch P are positioned at a point convenient to the machine operator and a limit switch L is positioned on the machine to be operated by a moving part thereof. In Figure 2 the limit switch L is operated by head H.

The remainder of the circuit is made up of three relays C, D, and E, each of which are double pole, single-throw type, and a time delay relay F.

The circuit can best be described by starting with the line voltage and taking up each step in the operation, identifying each line and connection point as the description progresses.

To place the circuit in operation for a timing cycle, the start button is pressed to close the start switch S which is biased to open position. Current from line A is connected to one side of coil 20, relay C. Closing start switch S directs current from source line AA to the other side

2 of coil 20 through lines 21, 22, board B, points 4 to 4, switch S and stop switch P, which is normally closed, and line 24 passing through point 1 of board B.

Energization of coil 20 closes switch blades 27 and 28. Line 29 connects a contact 30 at blade 27 to the bridge connection 31 of the start-stop switches, thus forming a holding circuit until the stop switch P is opened. Line connections A and AA are thus connected, respectively, to the contact 30 of relay C and the contact 32 each of which lead directly by lines 33 and 34 to contacts 35 and 36 of relay D. Blades 37 and 38 of relay D are biased closed to contacts 39 and 40. Current from source lines A and AA is, therefore, conducted from relay D to coil 42 of relay E through lines 43 and 44, energizing the coil and closing switch blades 47 and 48 to contacts 49 and 50. Source line A is then connected to load line, point 7 on board B through lines 51, 52, 53, blade 48, contact 50 and line 54. Source line AA is connected to load line point 6, board B, through lines 55, 21, blade 47, contact 49, and line 56. Lines 6 and 7 of board B connect to motor M, operation of which is thus started.

Briefly: Closing start switch S energizes relay E through relays C and D, the relay C being held closed by a holding circuit and relay D being normally closed. Current to load passes through the relay E.

Motor M runs until the particular operating mechanism to be controlled moves to a point to contact and close limit switch L. In Figure 2 when head H strikes arm 60 of limit switch L, contacts 61 and 62 of the switch are bridged and line 22 is connected to a line 64 leading to time delay relay F at contact 66. Source line AA is thus connected to relay F at 66 while source line A is connected to relay F through lines 51, 52 and 68 at contact 69.

Figure 3:
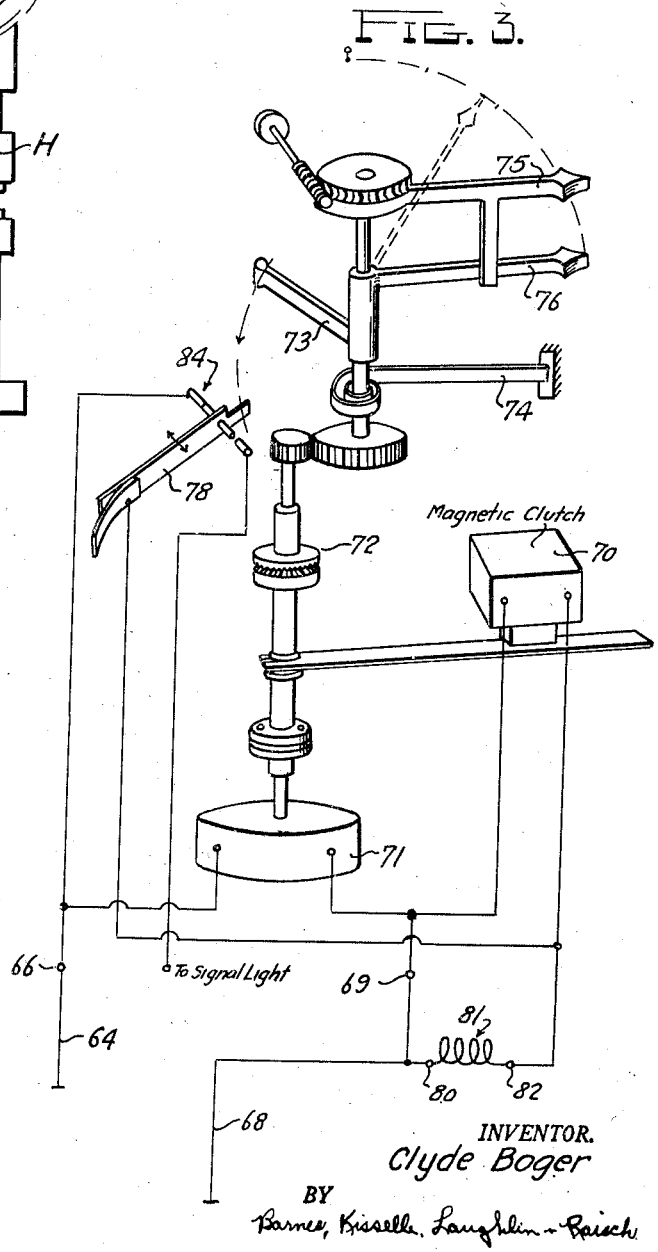
Figure 3 is a view of a timer showing various parts thereof in exploded view.

In Figure 3 the timer is shown diagrammatically. Current at points 66 and 69 cause actuation of electromagnet 70 and synchronous motor 71. Electromagnet 70 operates a clutch 72 to start rotation of actuating arm 73 against a spring 74. Setting hands 75 and 76 determine the amount of travel of arm 73 before it contacts and shifts switch arm 78.

Contact 69 from line A is also connected through line 79 to contact 80 of relay coil 81—relay D. Contact 66 connects to contact 82 of coil 81 through switch 78 so that closing limit switch L energizes coil 81 and opens contacts 39 and 40. As a consequence power is cut off from coil 42 of relay E and upon opening of the blades 47—48, power is cut off from motor M. Head H then remains in fixed position until timer arm 73 contacts switch arm 78 opening switch 84 by reason of the operation of the synchronous motor. Opening of switch 84 breaks current to coil 81 and closes relay D thereby again directing current to coil 42 of relay E and placing voltage at board points 6 and 7 and motor M.

This cycle will repeat itself with an exact time delay each time since time delay relay F will reset itself each time that switch L is opened and clutch 72 is released.

To stop the running circuit, stop button is pressed and this cuts off current from line 29 to line 24. The holding circuit is thus broken and coil 20 of relay C de-energized.

The operation described briefly in recapitulation is as follows: Relay C, is energized and closed by "Start" button S and bound into a holding circuit through "Stop" switch P. Current through relay C sends current through relay D, closed when de-energized, to relay E which when closed connects motor M to source lines. Limit switch L, when actuated energizes and opens relay D through switch 84 in time delay relay F, which switch opens after a predetermined lapse of time to de-energize and close relay D so the cycle may repeat.

Functionally, the over-all operation of the system may be described as follows: Motor M, after being energized by operation of the start button, runs until one downstroke of the head H has been completed, at which time the limit switch L is actuated. Closing switch L will stop motor M by energizing relay D through switch 84 in time delay F. As previously described, the energizing of relay D opens the relay to interrupt current to solenoid 42 of relay E. At the same time, actuation of the limit switch initiates movement of the time delay motor 71 and causes the magnetic clutch to start the movement of the actuator member 73. After a suitable time interval, the operating timer opens switch 84 to de-energize relay D and thus cause energization of solenoid 42 which closes the relay E and again re-connects the motor M. At the same time, the operation of the timer is discontinued, and the timer is automatically reset until the limit switch is again operated by the punch.

What I claim is:

1. An electrical control system for an electrically operated mechanism which comprises a source of electrical energy, a conductive means for connecting said source to said electrical power unit, a solenoid operated relay switch interposed in said conductive means, a second conductive means for directing energy from said source to said solenoid operated relay, a second normally closed relay in said second conductive means, a time delay means for controlling electrical energy from said source, and means connecting said time delay means to said second relay whereby in response to predetermined time movement of said mechanism, said second relay is operated to interrupt energy to said first solenoid operated relay to interrupt energy to said electrical mechanism.

2. An electrical control system for a power unit which comprises a source of electrical energy, means for conducting said energy to said unit, a solenoid operated switch interposed in said conductive means to interrupt current therein, two solenoid operated relay switches in series in a conductive circuit leading to the solenoid of said first mentioned switch means, the first of said last group of relays being operated by a starting circuit, the second of said relays being biased to closed position, and a limit switch interposed in a conductive circuit to said closed relay to cause actuation and opening of the switches thereof to interrupt current to the first switch solenoid thereby cutting off energy to said power unit, and a time delay switch means operable at a predetermined time to break current to said normally closed relay and restore operation of said power unit.

3. An electrical control system for an electrical power unit and a member to be actuated thereby, which comprises a source of electrical energy, conductive means to carry said energy from said source to said power unit, a main switch interposed in said conductive means to control energy passing therethrough, a solenoid operable to close said switch, and means for controlling the operation of said solenoid in said main switch which comprises a first relay movable to a closed position by actuation of a starting switch, a holding circuit for maintaining said first relay in closed position, a second relay, a conductive circuit leading from said first relay to said solenoid to be actuated, said second relay being interposed in said conductive means and biased to a closed position, a time delay relay, a limit switch to be actuated by said moving member and operable to start said time delay relay, and means connecting said limit switch to said second relay, whereby actuation of said limit switch opens said second relay; said time delay switch, after a predetermined elapse of time, being operable to interrupt said limit switch circuit to cause closing of said second relay and resumption of energy flow to said main switch solenoid.

4. An electrical control system for an electrical power unit and a member to be actuated thereby, which comprises a source of electrical energy and conductive means between said source and said power unit, a starting relay operable in response to a manual start switch, a holding circuit for said relay, a stop switch to interrupt said holding circuit, a main switch to direct and interrupt flow of said power unit, and an interrupter circuit comprising electrical means to operate said main switch, and switch means to control the electrical means including a limit switch to be operated by said member after predetermined movement thereof, an intermediate relay to be actuated in response to closing of the limit switch to cut off said electrical means, and a time measuring means between said limit switch and intermediate relay to nullify actuation of the limit switch after a pre-determined time lapse.

5. An electrical control system for an electrical power unit and a member to be actuated thereby, which comprises a source of electrical energy and conductive means between said source and said power unit, a starting relay operable in response to a manual start switch, a holding circuit for said relay, a stop switch to interrupt said holding circuit, a main switch to direct and interrupt flow to said power unit, and an interrupter circuit comprising electrical means to operate said main switch, and switch means to control the electrical means including a limit switch to be operated by said member after predetermined movement thereof, an intermediate relay conducting energy from said starting relay to said electrical means, and operable to open upon operation of said limit switch, and a time measuring means between said limit switch and intermediate relay to nullify actuation of the limit switch after a predetermined time lapse.

6. An electrical control system for an electrical power unit and a member to be actuated thereby comprising a first, second and third switch, a first, second and third solenoid for operating each switch, respectively, the first and third switches being biased open, the second switch being biased closed, the third solenoid receiving current through the first and second switches, a supplemental starting circuit to energize said first solenoid, and a supplemental interrupter circuit to actuate said second solenoid including a limit switch operable by said member, and a time measuring means between said limit switch and second solenoid to nullify the effect of the limit switch upon a predetermined time lapse.

7. A control system as described in claim 6 in which the time measuring means is started by closing of said limit switch.

CLYDE BOGER.

REFERENCES CITED

The following references are of record in the file of this patent:

UNITED STATES PATENTS

| Number | Name | Date |
| --- | --- | --- |
| 1,342,915 | Johnson | June 8, 1920 |
| 1,978,947 | Johanson et al. | Oct. 30, 1934 |